(No Model.) 2 Sheets—Sheet 2.
E. H. LEE.
WOOD WORKING AND PLANING MACHINE.
No. 385,125. Patented June 26, 1888.
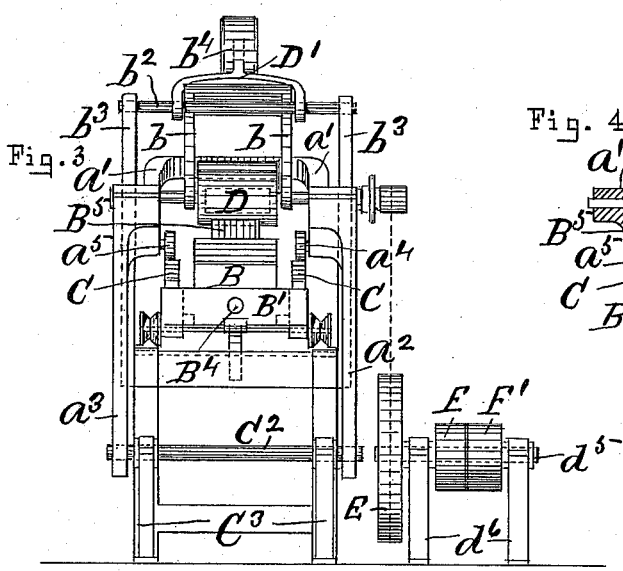
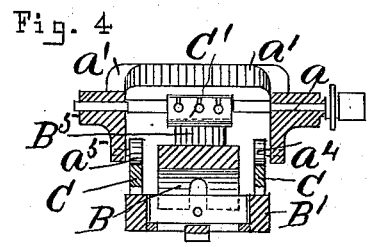
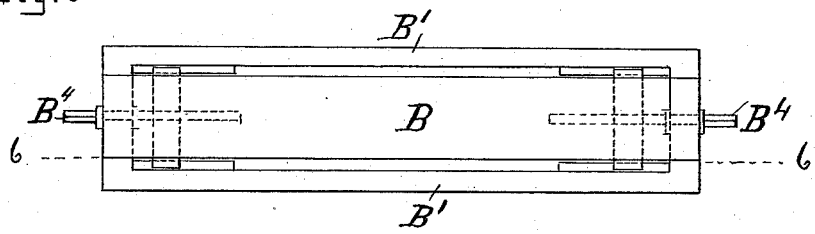
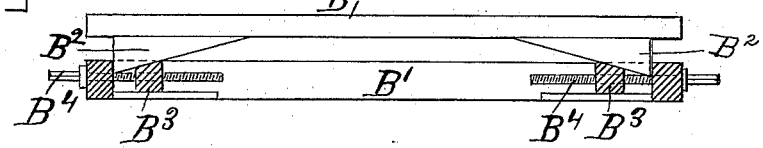
Witnesses
L. M. Freeman
V. Stanwood
Inventor,
Elbe H. Lee.
By L. B. Coupland & Co.
attys.

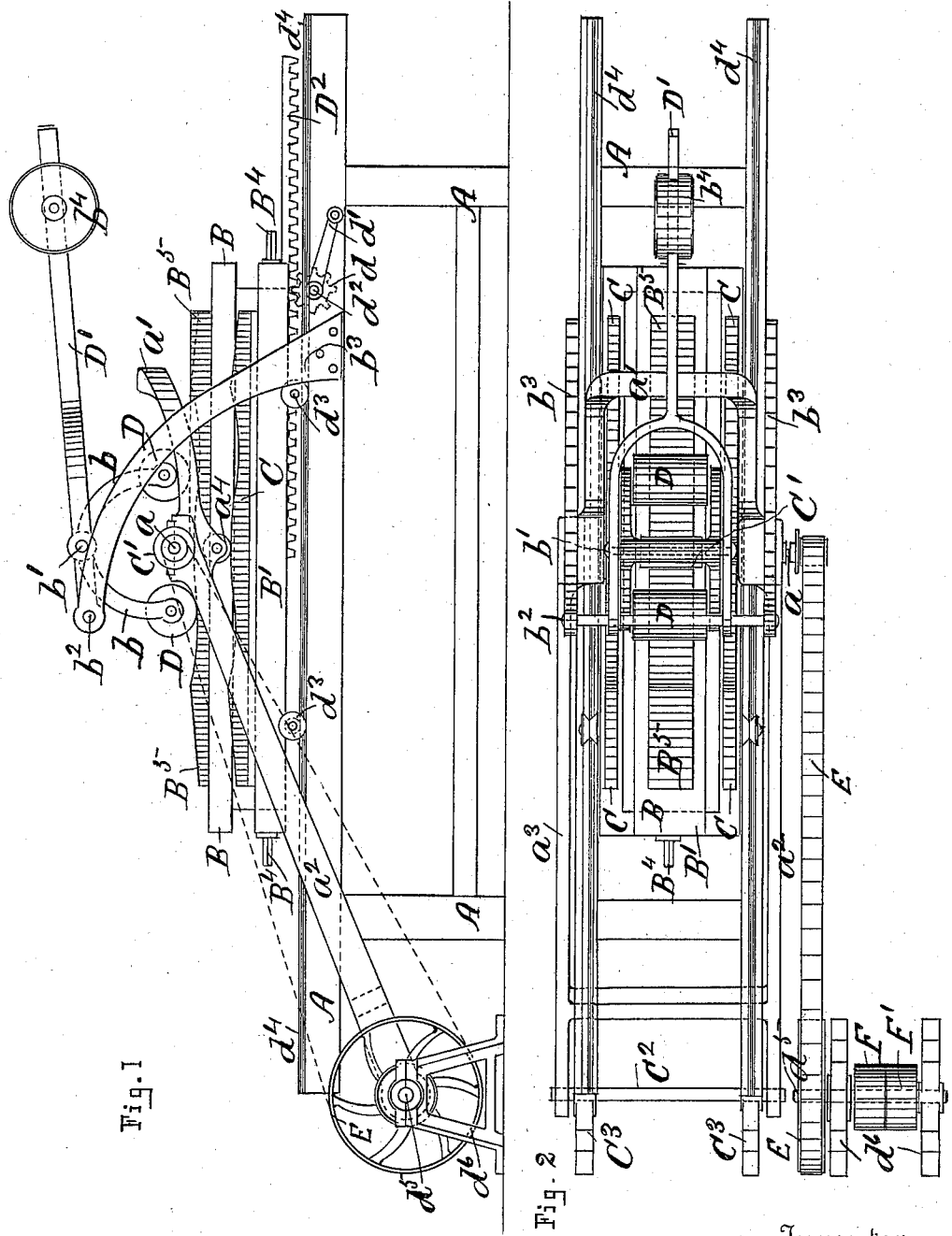

UNITED STATES PATENT OFFICE.

ELLEF H. LEE, OF CHICAGO, ILLINOIS.

WOOD WORKING AND PLANING MACHINE.

SPECIFICATION forming part of Letters Patent No. 385,125, dated June 26, 1888.

Application filed November 19, 1887. Serial No. 255,585. (No model.) Patented in Norway September 13, 1886, No. 270.

*To all whom it may concern:*

Be it known that I, ELLEF H. LEE, a subject of the King of Norway, residing at Chicago, in the county of Cook and State of Illinois, have invented a new and useful Wood Working and Planing Machine, (for which I have obtained a patent in Norway, No. 270, bearing date of September 13, 1886,) of which the following is a specification.

The object of this invention is to provide a wood-working machine that is more especially intended for use in cutting out and dressing snowshoe-runners and similar articles having irregular forms and surfaces, the same consisting of certain novel features in the combination, arrangement, and operation of the several parts, as will be hereinafter set forth.

Figure 1 is a side elevation of a machine embodying my improved features; Fig. 2, a plan view; Fig. 3, an end elevation; Fig. 4, a vertical transverse section in the plane of the cutter-head; Fig. 5, a plan of the carriage or table bed; Fig. 6, a vertical longitudinal section of the same in the plane 6, Fig. 5.

Referring to the drawings, A represents the different parts of the supporting-frame on which the working mechanism is mounted.

The traveling carriage consists of the table B, on which the work is placed, and the lower part or traveling bed, B', which is in the form of a rectangular frame, as shown in Figs. 1, 5, and 6. The table B is of a width corresponding to the opening in the bed B', and is provided on the under side, at each end, with the beveled cleats $B^2$ $B^2$, (see Fig. 6,) which seat inside the table-bed and rest upon the wedging-blocks $B^3$ $B^3$, having a corresponding beveled surface. These blocks are rigidly mounted on the adjusting-screws $B^4$ $B^4$, placed at each end of the rectangular frame forming the table-bed. These screws have a threaded engagement in the end pieces of the bed, and by rotating the same the table B may be raised or lowered, as required.

$B^5$ represents the piece of material or stock placed upon the table to be dressed, and C C the duplicate patterns or models of the design or outline to be reproduced. These patterns are placed on the bed-frame each side of the table B, as shown in Figs. 2, 3, and 4. The cutter-head C' is mounted on the shaft $a$, the ends of which are journaled in the yielding bearing-frame, consisting of the yoke $a'$, extending backward from the cutter-head and a little above the carriage, and two inclined side bars, $a^2$ $a^3$, extending downward to the front of the machine, where the ends have bearings on the rock-shaft $C^2$, which is in turn journaled in the stand $C^3$. This arrangement permits the frame in which the cutter-head is journaled to have a slight oscillation, so that the cutter-head may readily and automatically adjust itself to the irregular surfaces being operated upon.

Below each cutter-head are located the guide-rollers $a^4$ $a^5$, (see Figs. 3 and 4,) which are journaled in the same frame therewith. These rollers rest upon the patterns and follow the irregularities of the same as they pass underneath, thus imparting a corresponding movement to the cutter-head, and thereby producing a copy of the pattern.

On each side of the cutter-head are located the pressure-rollers D D, which rest upon the piece of material being operated upon and keep it in close contact with the traveling table. These rollers are journaled at each end in the companion curved arms $b$ $b$. These arms are mounted on and near the ends of the shaft $b'$ and have a swinging or rocking motion thereon, so that the rollers will follow the irregular surface of the path made by the cutter-head and maintain a continuous pressure on the work.

D' is a weighted lever, the inner part of which is forked and has a fulcrum-bearing on the shaft $b'$, the extreme fork ends engaging with the bearing-pin $b^2$, the ends of which are in turn supported in the upper ends of the curved standards $b^3$ $b^3$, attached to and extending upward from the side pieces of the framework. The lever D' is provided on the outer end with the adjustable weight $b^4$, whereby the pressure exerted on the work by the presser-rollers D D may be varied as circumstances may require.

$D^2$ is a rack-bar attached to the under side of the traveling bed B', and $d$ a pinion journaled in the stationary frame-work A and engaging with said rack-bar, and $d'$ a hand-crank mounted on the pinion-shaft $d^2$, whereby the necessary reciprocating movement is imparted to the carriage by hand. The truck-rollers $d^3$ have suitable journal-bearings in the under part of the bed-frame B and travel on the track-rails $d^4$, laid on the top of the stationary frame-work.

It is obvious that any motive power other than hand may be employed in imparting motion to the carriage.

Motion is transmitted to the cutter-head by the belt E, leading from the band-pulley E', mounted on the shaft $d^5$, journaled in the stand $d^6$.

F F' are the usual tight and loose pulleys belted with the motive power.

Having thus described my invention, what I claim as new, and desire to secure by Letters Patent, is—

1. In a wood-working machine, the combination, with a reciprocating carriage consisting of the table B and the table-bed B', of the cutter-head C', the shaft $a$, on which said cutter-head is mounted, the yoke $a'$, the inclined side bars, $a^2$ $a^3$, the rock-shaft $C^2$, the stand $C^3$, and the guide-rollers $a^4$ $a^5$, journaled in the same frame with and below the cutter-head, substantially as and for the purpose set forth.

2. The combination, with the presser-rollers D D, of the curved arms $b$ $b$, in which said rollers are journaled, the shaft $b'$, supporting said arms, the weighted lever D', having a fulcrum-bearing on the shaft $b'$, the bearing-pin $b^2$, with which the forked ends of said lever engage, and the supporting-standards $b^3$ $b^3$, whereby said rollers are adapted to conform to and follow the movements of the cutter-head, substantially as and for the purpose set forth.

ELLEF H. LEE.

Witnesses:
   E. C. CRAWFORD,
   W. C. CORLIES.